United States Patent [19]

Kelly et al.

[11] 4,055,669
[45] Oct. 25, 1977

[54] FOOD BAR AND PROCESS OF PREPARING SAME

[75] Inventors: Ray G. Kelly, Kirkwood; Kenneth R. Pruitt, Sr., Arnold; Alvin L. Kershman, Bridgeton, all of Mo.

[73] Assignee: Sunmark, Inc., St. Louis, Mo.

[21] Appl. No.: 586,970

[22] Filed: June 16, 1975

(Under 37 CFR 1.47)

Related U.S. Application Data

[63] Continuation of Ser. No. 367,115, June 4, 1973, abandoned.

[51] Int. Cl.$^2$ .............................................. A23L 1/34
[52] U.S. Cl. ......................................... 426/93; 426/307; 426/309; 426/613; 426/656
[58] Field of Search .................. 426/89, 93, 307, 309, 426/601, 656, 613

[56] References Cited

U.S. PATENT DOCUMENTS

| | | | |
|---|---|---|---|
| 2,170,155 | 8/1939 | Masher | 426/93 |
| 3,362,829 | 1/1968 | Lawfried et al. | 426/99 |
| 3,582,336 | 6/1971 | Rasmusson | 426/309 |
| 3,793,464 | 2/1974 | Rusch | 426/89 |

*Primary Examiner*—Joseph M. Golian
*Attorney, Agent, or Firm*—Koenig, Senniger, Powers and Leavitt

[57] ABSTRACT

A high protein fat-occluded food composition useful as a binder, and a food or breakfast bar product prepared therefrom. The binder composition comprises edible solid particles including a protein source coated with an edible fat. The presence of the fat as a coating on the edible particles masks flavors arising from the protein. The binder composition contains at least about 15% by weight protein, between about 33% and about 85% by weight fat and up to about 52% by weight carbohydrate. The food bar product comprises cereal particles bound together with the binder composition of the invention.

23 Claims, No Drawings

FOOD BAR AND PROCESS OF PREPARING SAME

This is a continuation, div., of application Ser. No. 367,115, filed June 4, 1973 now abandoned.

BACKGROUND OF THE INVENTION

This invention relates to the field of food compositions and more particularly to an improved food bar, suitable as a meal substitute, and to a food composition having adhesive properties useful as a nutritional binder in said food bar.

In recent years there have been substantial efforts in the food art devoted to the development of meal substitutes, particularly breakfast substitutes, which may provide nutrition under circumstances in which time, location or other factors preclude the consumption of a conventional meal. To serve satisfactorily as a meal substitute, a food item should possess a number of essential characteristics which adapt it for convenient use under the limitations of time, space, and/or the absence of cooking facilities and cleaning facilities which render the consumption of a conventional meal impractical.

Thus, it is highly desirable that a meal substitute be a "finger food" which can be handled without utensils and without leaving significant amounts of messy residue on the hands or on surfaces upon which it is placed. It should be substantially nonperishable, even in the absence of refrigeration, and subject to inexpensive packaging in packaging materials which may be readily discarded. To provide for ready portability and rapid consumption, it should be light in weight and nonbulky; yet it must possess a high nutritional value and, in particular, a high protein content so as to provide sustenance equivalent to that of a conventional meal.

Generally, meal substitutes are prepared in "bar" form so that they may be packaged and handled in the manner of a candy bar, brownie or small cake. A manageable size for a product of this nature, from the standpoint of both package size and time required for consumption, is on the order of about 3 ounces. To provide adequate nutrition, on the other hand, the meal substitute should contain at least about 15 grams of protein. Because many proteins and protein sources per se have a rather disagreeable flavor, serious difficulty is presented in achieving both the requisite minimum protein content and an appealing flavor in a bar of the desired 3 ounce size. Certain of the high protein food bars which are commercially available have suffered, in fact, from the adverse effect of unmasked protein flavor. Other such products have a satisfactory taste but contain an insufficient proportion of protein.

Food bars suitable for use as meal substitutes are of interest and value primarily as breakfast substitutes. For this purpose, it is desirable that the bar have the flavor of a conventional breakfast-type food, e.g., French toast or orange Danish coffee cake, such flavors can be readily imparted to a basic nutritional food composition containing protein, fat and carbohydrate by addition of known artificial flavors thereto, provided that the taste of the basic nutritional composition is compatible with the flavors added. Many if not most protein flavors, however, whether properly considered as "off-flavors" or not, are incompatible with certain flavors which are most desirable for a breakfast bar. Prior to the present invention, a protein-rich food binder composition free of protein induced flavor has not been commercially available for use in a breakfast food bar.

An unfulfilled need has existed in the art, therefore, for a compact, high protein food bar having a pleasing flavor substantially free from unmasked protein flavor notes.

SUMMARY OF THE INVENTION

Among the several objects of the present invention, therefore, may be noted the provision of a food bar product suitable as a meal substitute, in particular as a breakfast substitute; the provision of such a bar having a high protein content; the provision of such a bar having a pleasant flavor substantially free of unmasked protein flavor notes; the provision of such a food bar which may be packaged in inexpensive, readily discardable packaging materials to provide a convenient portable packaged meal substitute; the provision of a food composition having adhesive properties useful in the preparation of a high protein, flavorful food bar product; and the provision of methods for economically producing the food bar and the adhesive food composition used in the preparation thereof. Other objects and features will be in part apparent and in part pointed out hereinafter.

The present invention is thus directed to a high protein content fat-occluded food composition having adhesive properties effective for binding food particles together. The adhesive food composition comprises edible solid particles including a protein source coated with edible fat so as to mask flavor arising from the protein. The composition contains at least about 15% by weight protein, between about 33% and about 85% by weight of fat and up to about 52% by weight of carbohydrate. The invention is further directed to a food bar comprising cereal fragments bound together with the aforesaid food composition. The invention further comprehends a meal substitute constituted by said food bar, together with methods for preparing both the food bar and the adhesive food composition used therein.

DESCRIPTION OF THE PREFERRED EMBODIMENTS

In accordance with the present invention, a high protein binder composition has been discovered which may be used to bind cereal particles together and form a compact food bar having a pleasing flavor yet a sufficiently high protein content to serve as a meal substitute. The binder composition of the invention is substantially free of the off-flavors which have heretofore been associated with high protein content food preparations. It is also free of the protein induced flavor exhibited by such products as peanut butter which, though not unpleasant, is incompatible with certain of the flavors most desirable for a food bar intended as a breakfast substitute.

When present to the extent of 60–70% in a 3–4 ounce cereal bar, the binder composition of the present invention provides a sufficient amount of protein, when taken together with the relatively small proportion of protein in the cereal components of the bar, to provide at least the 15 gram minimum of protein needed for a meal substitute. A bar constituted by cereal particles and the binder composition of the invention is substantially nonperishable at ambient temperatures when packaged in the conventional paper, cellophane, cardboard, etc., of a typical candy bar package, to provide an individually packaged meal substitute which is readily portable and may be eaten at essentially any time or place. No heating or other preparation is required prior to consumption. The cereal bar of the invention is a fully satisfactory "finger food" and may be eaten without leaving substantial residues on either the hands or on any surface upon which the bar is placed.

The inclusion of high proportions of protein, i.e., 15% by weight or more, in the binder composition of the invention without imparting a perceptible off-flavor thereto is achieved by providing a "fat-occluded" system. By this it is meant that the individual particles of protein and carbohydrate contained in the binder composition are substantially coated with fat. The fat component, which has a generally appealing taste, thus masks the otherwise adverse effect of the protein flavor.

The advantageous effect of fat occlusion on flavor has received some recognition in a context separate from that of food bars. Thus, O'Rourke U.S. Pat. No. 2,904,438 describes the desirability of fat encapsulation in a chocolate composition. However, O'Rourke's composition contains a maximum of 21-22% by weight milk solids which provides a protein content of only about 8% by weight. In the field of food bars, on the other hand, much of the effort has been devoted to spray dried compositions such as that taught in Durst U.S. Pat. No. 3,431,112 in which fat globules as a discontinuous phase are encapsulated in a continuous phase of water and protein. In such products, the protein is relatively exposed and may cause an unpleasant taste experience. Among the food bar binders not prepared by spray drying, that described in Rasmussen U.S. Pat. No. 3,582,336 may possess considerable merit. Rasmussen, however, does not indicate that his binder composition is fat occluded and, in any event, shows a maximum of about 20% milk solids, a protein content of only about 7-8%. Thus, heretofore, no known food bar has contained a high protein, fat-occluded artificial binder.

A known composition which may be considered fat occluded and which does have a higher protein content is ordinary peanut butter. In peanut butter, however, the protein flavor is not masked. Although both peanut oil and defatted peanut meal individually exhibit a rather bland taste, their combination is peanut butter produces a very strong characteristic taste which is incompatible with certain of the flavors whose use is preferred in a food bar intended as a breakfast substitute. The peanut butter flavor apparently arises from some synergism of more subtle flavor notes in the protein and oil or else emanates primarily from the protein as "brought out" by the oil. In any event, the protein flavor is not masked.

In accordance with the present invention, it is now been discovered that a fundamentally bland fat-occluded binder composition useful in the preparation of a cereal or food bar can be produced containing 15% by weight protein or even higher amounts thereof. The preferred binder composition of the invention has a protein content of about 23% by weight and, where carbohydrate is substantially absent, the protein content of the fat-occluded binder composition may range as high as 40% by weight. The fat content of the binder composition ranges from a minimum of about 33% by weight to a maximum of about 85% by weight, preferably about 47% by weight, and the carbohydrate content of the composition may range up to about 52% by weight. A portion of the carbohydrate content may be derived from the protein source where the latter is not pure protein.

The attainment of fat-occlusion in compositions containing high proportions of protein is realized by intense mixing of the composition's components at a temperature above the melting point of the fat. Normally, size reduction of the protein source and carbohydrate source particles is also an important objective of the mixing process. Reduction of these particles to an average size of 100μ or less enhances the adhesive properties of the binder composition. An average particles size of 50μ is preferred.

In a preferred embodiment of the invention, the ingredients of the binder composition are premixed, subjected to roll milling and then to further mixing after the milling is complete. In this method, a dry blend of the carbohydrate and protein source is initially prepared at elevated temperature in a suitable mixing vessel such as a Hobart mixer. Molten fat is then added to the dry blend and the resultant mixture is slowly agitated to distribute the fat. After satisfactory distribution of the fat has been attained, for example, after 15 minutes, the fat/carbohydrate/protein mixture is passed through a roll mill which reduces the solid protein source and carbohydrate source particles to the desired size, e.g., 50μ average. The appropriate roll mill pressure may be readily established empirically by microscopic examination of the milled product. After milling, the binder composition is heated and subjected to further mixing, preferably for a period of 2 hours or more. To enhance the fluidity of the mixture, up to 1% by weight of lecithin, preferably about 0.075% by weight, may be added during the final mixing. The viscosity of the finished binder is preferably between about 5,000 and about 25,000 cps (Brookfield) and is optimally 300° MacMichael (M).

Although the above method is preferred, a high protein fat-occluded product can be obtained by other intense mixing methods not necessarily involving the use of a mill. Thus, for example, a Hobart mixer fitted with wire whisk agitator operated at high speed, or other high shear mixers, such as a Dispersator, may be employed to blend the protein, carbohydrate and molten fat.

The protein source constituent of the binder composition is preferably either a dairy protein product or a vegetable protein product, with dairy protein being especially preferred because of its superior organoleptic properties. Among the various dairy protein sources which may be employed are nonfat milk solids, sodium caseinate and the protein sources sold under the trade designations "Proto-Lac" by Borden, "LP-10" by Purity Cheese and "Nutricase" and "Fortein-29" by Foremost Dairies, Inc. Among the vegetable protein sources which may be used in the binder composition are the soy isolates sold under the trade designations "Supro 610", "Edi-Pro A" and "Edi-Pro N" by Ralston Purina, "Promine D" and "Promine F" by Central Soya and the "Sesame flour" sold by John Kraft. Generally, the protein content of the protein source used should be at least about 20-25% by weight.

The carbohydrate constituent of the binder composition may be essentially any edible carbohydrate but is preferably a monosaccharide or disaccharide in solid form. A particularly suitable carbohydrate is dextrose, but it will be understood that various other carbohydrates such as sucrose, lactose and fructose may be used.

The fat ingredient of the binder composition should be substantially solid at room temperature but become a smooth fluid at mouth temperature. A small proportion of fats which have melting temperatures up to about 100° F., and thus require some mastication, can be tolerated in the binder composition. However, the binder should be predominantly constituted by triglycerides having melting points between room temperature and mouth temperature (about 92° F.), and it is strongly preferred that the proportion of triglycerides remaining solid at 92° F. be sufficiently low to avoid a noticeable effect on smoothness and fluidity. Generally, the Wiley solid fat index of the fat ingredient should be on the order of 60–70 at 70° F., essentially 0° at 100° F., and not more than 25–30 at 92° F. These characteristics of the fat ingredient impart a pleasant "melt in your mouth" character to the binder composition and differentiate it from stickier and heavier products, such as peanut butter, which contain significant amounts of solid fat at temperatures well above 100° F.

Among the particular fats which are useful in the binder composition of the invention are those sold under the respective trade designations "SP-7" and "SP-4" by Capital City Products Company, "Kaomel", "AER-8" and "Magna C" by Glidden-Durkee and "Wilmar Vegetable Hardbutter MCL95" and "Wilmar VHB 57A95" by Wilson Martin Division of Wilson Pharmaceutical and Chemical Corporation. For nutritional purposes, at least about 1% by weight of the fat which is utilized should be constituted by the triglyceride of linoleic acid.

The strength of a cereal bar prepared from the binder composition of the invention is improved if the binder includes a small proportion, i.e., up to about 1% by weight, of monoglycerides and diglycerides. Because of their relatively high melting points, the presence of monoglycerides and diglycerides tends to reduce the pleasant cooling effect perceived by the tongue as the triglyceride fats melt in the mouth. For this reason, the mono and diglyceride content is preferably kept as low as possible consistent with adequate strength of the bar.

As desired, various vitamins, minerals, emulsifiers and colors as well as flavors may be incorporated in the binder composition of the invention. To provide the micronutrient content of a breakfast consisting, for example, of one egg, one pat of butter, one piece of toast, two strips of bacon and a 4-ounce glass of orange juice, the amount of binder composition utilized in preparation of a cereal bar should contain 1,475 I.U. vitamin A, 100 I.U. vitamin D, 70 mg. vitamin C, 0.43 mg. thiamine, 0.435 mg. riboflavin, 4.6 mg. niacin, 179.5 mg. calcium, 194 mg. phosphorus, 2.5 mg. iron, 7.5 mg. vitamin E, 0.5 mg. vitamin $B_6$ and 1.25 mcg. vitamin $B_{12}$.

To produce a breakfast bar in accordance with the invention, crushed dry cereal having a particle size of greater than about 30-mesh and less than about 6-mesh, U.S. sieve size, is blended with the binder composition and the resulting blend is formed into bars of the desired size and shape. Blending is a relatively simple but rather critical operation. The blending temperature should be controlled in the range of 100° to 140° F. and the degree of mixing should be limited to that necessary to wet the cereal particles. If the mixing operation is carried out for too long a period of time or with overly strong agitation, excessive crushing of the cereal particles can result, yielding a dense product having a hard eating quality and a fatty appearance.

The cereal/binder blend is formed into the cereal bar product of the invention which is then packaged for distribution, sale and consumption. Each packaged product constituting a meal substitute for one meal may include one, two or more bars having a total weight of preferably not more than about 3 to 4 ounces. The cereal content of the blend, and thus of the finished bar, may range as high as 40% by weight but is preferably on the order of 30% by weight. To provide a total of 15 grams of protein in a 3-ounce product containing 30% by weight cereal, the protein content of the binder composition used in the bar should be on the order of about 23% by weight, depending, of course, upon the protein content of the cereal employed.

A wide variety of dry cereals may be used as the cereal component of the cereal bar. Wheat and rice cereals are particularly satisfactory, with rice being generally preferred. Corn and oat cereals, while less satisfactory, may also be employed in the practice of the invention. Thus, useful cereals include such commercially available cereal products as puffed rice, toasted rice, wheat flakes, whole bran cereal, puffed wheat, wheat flakes, etc. The cereal utilized is preferably as dry as possible, for example, 2.5% by weight moisture, so as to enhance the crispness of the cereal bar and limit the perception of fattiness in the bar.

The following examples illustrate the invention.

EXAMPLE 1

A binder composition was prepared from the following ingredients:

| Ingredient | % by Weight |
|---|---|
| Fat | 27.0 |
| Sodium Caseinate | 5.0 |
| Non Fat Milk Solids | 51.5 |
| Sugar | 16.5 |

The sugar, nonfat milk solids and sodium caseinate were first blended in a 3-quart Hobart mixer held at 120° F. in a water bath. The fat, preheated to approximately 140° F., was added to the dry blend and mixing was continued for 15 minutes using a dough arm at slow speed. The crude mixture obtained was passed through a 12 inches-3 roll mill to reduce the solid particles to an average particle size of approximately 50μ. The roll mill pressure was empirically established by microscopic examination of the milled product. After milling, the mixture was reheated in an oil bath to 120° F. and transferred back to a 3-quart Hobart mixer. After 5 minutes of mixing, sufficient lecithin was added for the purpose of adjusting the fluidity of the mixture to the desired level, i.e., a viscosity of approximately 300° M. The required amount of lecithin was approximately 0.075% by weight of the mixture. After the lecithin addition, mixing was continued for another 15 minutes and a sample was removed for viscosity determination. Mixing was then continued at high speed for an additional 2 hours until the viscosity of the mixture stabilized at a constant value of approximately 300° M.

EXAMPLE 2

The cereal sold under the trade designation "Wheat Chex" by Ralston Purina was reduced in size by impact crushing in a 10-quart Hobart mixer equipped with a wire whip and operated at low speed. The particles obtained from the size reduction operation were screened on a 30-mesh screen to remove fines. Approximately 10% of the crushed product was minus 30 mesh and was removed in the screening operation.

Using a 3-quart Hobart mixer equipped with a paddle operating at low speed, the crushed Wheat Chex particles were blended with the binder composition prepared in Example 1 in a ratio of approximately 3 parts of crushed Wheat Chex per 7 parts binder composition. Several different blends were prepared to test the effect of mixing time and mixing temperature. Table I shows the importance of limiting the blending time to the minimum period required to wet the cereal particles, i.e., about 5-10 minutes.

Table I

| Time (min.) | Strength Test | Appearance |
| --- | --- | --- |
| 5 | 1100 | V. Sl. Fatty |
| 10 | 1200 | V. Sl. Fatty |
| 20 | 1500 | Mod. Fatty |
| 30 | 1600 | Very Fatty |

Blending temperature is also important. Below 100° F., the fat tends to prematurely crystallize and the blend has no strength. If blending is carried out above 130°-140° F., on the other hand, denaturation of the protein may result. Table II shows the effect of blend temperature on product strength.

Table II

| Blend Temperature | Strength |
| --- | --- |
| 130° F. | 1750 |
| 120° F. | 1375 |
| 110° F. | 1425 |
| 100° F. | 1425 |

EXAMPLE 3

A series of binder compositions consisting of fat, sodium caseinate, nonfat milk solids, sugar, emulsifiers, flavors and colors were prepared in the manner described in Example 1 and blended with crushed cereal for approximately 5 minutes at a temperature of 100°-130° F. in the manner described in Example 2. The blends obtained had the compositions set forth in Table III.

Table II

| | Binder Compositions | | | |
| --- | --- | --- | --- | --- |
| Ingredient | Blend A % By Weight | Blend B % By Weight | Blend C % By Weight | |
| Fat | 23.390 | 32.541 | 18.900 | |
| Sodium Caseinate | 10.612 | 10.960 | 7.000 | |
| Non Fat Milk Solids | 17.479 | 18.078 | 35.700 | (Whey) |
| Sugar | 18.109 | 8.362 | 8.400 | (Dext.) |
| Cereal | 30.000 | 30.000 | 30.000 | |
| Emulsifiers | 0.008 | 0.099 | — | |
| Flavors & Colors | 0.402 | — | — | |
| | 100.000 | 100.000 | 100.000 | |
| % Protein | 18.05 | 18.60 | 17.97 | |

The blends of this example and of Example 2 may be formed into finished bars by any of a variety of conventional methods. Thus, bars may be formed using a metal mold, a docking frame, an N.I.D. Bar Former, etc. After forming, the bars may be cooled in a conventional fashion, for example, in a 120 ft. cooling tunnel with 60° F. air for a period of 3-30 minutes.

EXAMPLE 4

A breakfast bar having a French toast flavor was prepared using a binder composition having the following ingredients in the indicated proportions.

| Ingredient | % By Weight | Weight (g.) |
| --- | --- | --- |
| AER - 8 (Glidden-Durkee) | 15.890 | 450.00 |
| SP/4 | 31.780 | 900.00 |
| Tween 65 | 0.476 | 13.50 |
| Lecithin | 0.080 | 2.25 |
| Sodium Caseinate | 15.007 | 425.00 |
| 6X Sugar (sifted) | 11.476 | 325.00 |
| Non Fat Milk Solids | 24.717 | 700.00 |
| Bread & Biscuit Fl. | 0.247 | 7.00 |
| Butter Emulsion | 0.099 | 2.80 |
| Butterscotch Lake | 0.129 | 3.65 |
| Canadian Maple Fl. | 0.099 | 2.80 |
| | 100.00 | 2832.00 |

To prepare the binder composition, the SP/4 was heated to 149° F. and 300 g. thereof introduced into a blender bowl. The butter emulsion was mixed with the SP/4 and the resulting fat solution poured into a 12-quart Hobart bowl. The remaining SP/4 (600 g.), the AER-8, Tween 65 and lecithin were added to the Hobart bowl which was then placed on a stove and heated to 150° F.

While the fat solution was heating, the dry constituents of the binder composition, i.e., sodium caseinate, 6X sugar, nonfat milk solids, bread and biscuit flavor, Canadian maple flavor and butterscotch lake were mixed thoroughly with a spatula. After the fat solution had reached 159° F., it was agitated with a wire whisk at slow speed while the dry blend was added over a period of about 2½ minutes. Agitation was continued with the wire whisk at high speed to whip and partially aerate the mixture and produce a finished binder composition having a density of 0.512 g./cc.

Twenty-six hundred grams of the finished binder compositions was mixed thoroughly by hand with 1114.2 g. of 12 mesh cereal particles until thorough intermixture was obtained providing a blend having an approximate density of 0.6 g./cc. 1722 grams of the blend was then slabbed on a board with a 14 inches ×25 inches ×7/16 inches frame and slowly rolled down until the top of the slab was substantially flat and even with the top edge of the frame. After the slab had set for approximately 20 minutes, it became sufficiently firm for cutting. 64 bars were cut from the slab using a cutter having edges spaced 2¾ inches apart.

A topping was prepared from the following ingredients.

| Ingredient | % By Weight | Weight (g.) |
| --- | --- | --- |
| SP/4 | 47.828 | 1350.00 |
| Lecithin | 0.081 | 2.30 |
| Sodium Caseinate | 15.058 | 425.00 |
| 6X Sugar (sifted) | 11.514 | 325.00 |
| Non Fat Milk Solids | 24.800 | 700.00 |
| Canadian Maple Fl. | 0.496 | 14.00 |
| Vantone 16X Pd. Vanilla Fl. | 0.028 | 0.80 |
| Butterscotch Lake | 0.195 | 5.50 |
| | 100.00 | 2832.60 |

A fat solution was prepared by heating the SP/4 and lecithin to a temperature of 140° F. in a small laboratory Hobart bowl. While the fat solution was heating, the dry constituents, i.e., sodium caseinate, 6X sugar, nonfat milk solids, Canadian maple flavor, vanilla flavor and the butterscotch lake were thoroughly mixed with a spoon to produce a dry blend. The fat solution contained in the Hobart bowl was then agitated with a paddle at low speed and the dry blend added slowly over a 2½ minute period. After addition was complete, mixing was continued for an additional 2½ minutes. The topping mixture thus prepared was cooled to 110° F. and coated over the bars produced above in the amount of approximately 4.25 g./bar.

EXAMPLE 5

A breakfast bar having a Danish coffee cake flavor was prepared using a binder composition having the following ingredients in the indicated proportions.

| Ingredient | % By Weight | Weight (g.) |
|---|---|---|
| AER-8 | 15.743 | 450.00 |
| SP/4 | 31.485 | 900.00 |
| Tween 65 | 0.472 | 13.50 |
| Lecithin | 0.079 | 2.25 |
| Sodium Caseinate | 14.868 | 425.00 |
| 6X Sugar (sifted) | 11.370 | 325.00 |
| Non Fat Milk Solids | 24.488 | 700.00 |
| Danish coffee cake Fl. | 0.784 | 22.40 |
| Lemon Fl. | 0.059 | 1.70 |
| Butterscotch Lake color | 0.652 | 18.65 |
| | 100.00 | 2858.50 |

The binder composition was prepared in the manner described in Example 4 and blended with crushed cereal particles in a ratio of 7 parts by weight binder to 3 parts by weight cereal in the manner further described in Example 4. Again, following the procedure of Example 4, the blend thus produced was rolled into a slab within a 14 inches ×25 inches ×7/16 inches frame and cut into 2¾ inches × 2¾ inches bars using a cutter of the type described in Example 4.

A topping composition having the following ingredients in the indicated proportions:

| Ingredient | % By Weight | Weight (g.) |
|---|---|---|
| SP/4 | 48.175 | 1350.00 |
| Lecithin | 0.082 | 2.30 |
| Sodium Caseinate | 15.166 | 425.00 |
| 6X Sugar (sifted) | 11.598 | 325.00 |
| Non Fat Milk Solids | 24.979 | 700.00 |
| | 100.00 | 2802.30 | was prepared in the manner described in Example 4 and spread on the tops of the food bars of this example in amounts of approximately 4.25 g./bar.

In view of the above, it will be seen that the several objects of the invention are achieved and other advantageous results attained.

As various changes could be made in the above methods and products without departing from the scope of the invention, it is intended that all matter contained in the above description shall be interpreted as illustrative and not in a limiting sense.

What is claimed is:

1. A food bar comprising particles of cereal bound together with an edible solid particulate adhesive food composition comprising a particulate protein source in a proportion sufficient that said composition contains at least about 15% by weight protein, between about 33% and about 85% by weight of edible fat, said fat being substantially solid at room temperature but becoming a smooth fluid at mouth temperature, and up to about 52% by weight of a carbohydrate selected from the group consisting of monosaccharides and disacchrides, the individual particles of said protein source and carbohydrate being substantially coated with said fat so as to mask flavors arising from said protein.

2. A food bar as set forth in claim 1 containing up to 40% by weight of cereal particles.

3. A food bar as set forth in claim 1 containing at least about 30% by weight cereal particles.

4. A food bar as set forth in claim 1 wherein the size of said cereal particles is greater than about 30-mesh U.S. sieve size and less than about 6-mesh U.S. sieve size.

5. A food bar as set forth in claim 4 wherein said cereal is a rice cereal.

6. A food bar as set forth in claim 1 wherein said protein source is selected from the group consisting of vegetable protein and dairy protein.

7. A food bar as set forth in claim 6 wherein said protein source is dairy protein.

8. A food bar as set forth in claim 1 wherein the solid fat index of said fat is between about 60 and about 70 at 70° F. and not greater than about 25–30 at 92° F.

9. A food bar as set forth in claim 8 wherein the solid fat index is substantially 0 at 110° F.

10. A food bar as set forth in claim 1 wherein at least 1% of said fat is constituted by the triglyceride of linoleic acid.

11. A food bar as set forth in claim 1 wherein said carbohydrate is dextrose.

12. A food bar as set forth in claim 1 wherein said adhesive food composition includes up to about 1% by weight of mono and diglycerides.

13. A food bar as set forth in claim 1 wherein said adhesive food composition includes up to about 1% by weight lecithin.

14. A food bar as set forth in claim 1 wherein the average size of said edible solid particles is no greater than about 100 microns.

15. A food bar as set forth in claim 1 wherein said adhesive food composition has a Brookfield viscosity of between about 5,000 and about 25,000 centipoises.

16. A food bar as set forth in claim 1 wherein said adhesive food composition comprises about 23% by weight protein.

17. A food bar as set forth in claim 16 wherein said adhesive food composition comprises about 47% by weight fat.

18. A food bar as set forth in claim 1 containing at least about 26% by weight cereal particles.

19. A food bar as set forth in claim 1 comprising a proportion of cereal particles sufficient to impart crispness to said bar.

20. A food bar as set forth in claim 1 comprising cereal particles substantially of a particle size greater than about 30-mesh.

21. A method of preparing a food bar comprising particles of cereal bound together with an adhesive food composition comprised of edible solid particles comprising a protein source coated with an edible fat so as to mask flavors arising from the protein, said composition containing at least about 15% by weight protein, between about 33% and about 85% by weight of said fat and up to about 52% by weight of a carbohydrate selected from the group consisting of monosaccharides and disaccharides;

said method comprising:
   blending the cereal particles and the adhesive food composition for approximately 5 minutes at a temperature of between about 100° F. –140° F. in a mixing vessel agitated by a slow speed anchor type agitator; and forming a food bar from the blend obtained.

22. A method as set forth in claim 21 wherein said adhesive food composition contains carbohydrate and the preparation thereof comprises the steps of:

intimately blending said carbohydrate and said protein source at elevated temperature;

adding molten fat to the dry blend of carbohydrate and protein source and agitating the resultant mixtures; and reducing the size of the particles contained in said mixture by milling said mixture, the milled mixture being subjected to further agitation to provide a high degree of uniformity in the distribution of the components.

23. A method as set forth in claim 22 wherein up to 1% by weight lecithin is added after milling to improve the fluidity of the composition.

* * * * *

UNITED STATES PATENT AND TRADEMARK OFFICE
CERTIFICATE OF CORRECTION

PATENT NO. : 4,055,669

DATED : October 25, 1977

INVENTOR(S) : Ray G. Kelly, Kenneth R. Pruitt, Sr., Alvin L. Kershman

It is certified that error appears in the above–identified patent and that said Letters Patent are hereby corrected as shown below:

Column 10, line 22, claim 9, "110°F." should read -- 100°F.--.

Signed and Sealed this

Twenty-first Day of February 1978

[SEAL]

Attest:

RUTH C. MASON
*Attesting Officer*

LUTRELLE F. PARKER
*Acting Commissioner of Patents and Trademarks*